United States Patent
Srivastava (10) Patent No.: US 9,117,074 B2
(45) Date of Patent: Aug. 25, 2015

(54) DETECTING A COMPROMISED ONLINE USER ACCOUNT

(75) Inventor: Kumar S. Srivastava, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 13/110,202

(22) Filed: May 18, 2011

(65) Prior Publication Data

US 2012/0297484 A1     Nov. 22, 2012

(51) Int. Cl.
*G06F 21/00* (2013.01)
*G06F 21/55* (2013.01)

(52) U.S. Cl.
CPC .................. *G06F 21/552* (2013.01)

(58) Field of Classification Search
CPC ............................. G06F 21/552; G06F 21/316
USPC .............. 726/22–26; 705/30, 38–41; 709/224
See application file for complete search history.

(56) References Cited

U.S. PATENT DOCUMENTS

| | | | |
|---|---|---|---|
| 6,167,435 A | 12/2000 | Druckenmiller et al. | |
| 6,484,203 B1 | 11/2002 | Porras et al. | |
| 6,704,772 B1 | 3/2004 | Ahmed et al. | |
| 6,721,748 B1 | 4/2004 | Knight et al. | |
| 6,832,244 B1 | 12/2004 | Raghunandan | |
| 6,964,017 B1 | 11/2005 | Meisner et al. | |
| 6,973,577 B1 | 12/2005 | Kouznetsov | |
| 7,096,498 B2 | 8/2006 | Judge | |
| 7,177,909 B2 | 2/2007 | Stark et al. | |
| 7,206,814 B2 | 4/2007 | Kirsch | |
| 7,213,260 B2 | 5/2007 | Judge | |
| 7,219,131 B2 | 5/2007 | Banister et al. | |
| 7,225,466 B2 | 5/2007 | Judge | |
| 7,237,009 B1 | 6/2007 | Fung et al. | |
| 7,306,256 B2 | 12/2007 | Walker et al. | |
| 7,328,244 B1 | 2/2008 | Kelley | |
| 7,386,892 B2 | 6/2008 | Gilfix et al. | |
| 7,409,708 B2 | 8/2008 | Goodman et al. | |
| 7,413,085 B2 | 8/2008 | Zager et al. | |

(Continued)

OTHER PUBLICATIONS

Ayodele, et al., "Email Classification and Summarization: a Machine Learning Approach", Retrieved at << http://userweb.port.ac.uk/~khusainr/papers/ccwmsn07_taiwo.pdf >>, IET Conference on Wireless, Mobile and Sensor Networks, Dec. 12-4, 2007, pp. 5.

(Continued)

*Primary Examiner* — Amir Mehrmanesh
(74) *Attorney, Agent, or Firm* — Bryan Webster; Kate Drakos; Micky Minhas (57) ABSTRACT

One or more techniques and/or systems are disclosed for detecting and/or mitigating a potentially compromised online user account. One or more baselines can be established for a user's online account to determine a normal usage pattern for the account by the user (e.g., frequency of incoming/outgoing emails, text messages, etc.). The online user account can be periodically or continually monitored for use of the same resources used to determine the baseline(s). If a deviation from the baseline is detected, the deviation may be compared against a threshold to determine whether the deviation indicates that the account may be compromised. When an indication of a potentially compromised account is detected, the user can be notified of the indication, so that one or more actions can be taken to mitigate the potentially compromised account.

20 Claims, 6 Drawing Sheets

(56) References Cited

U.S. PATENT DOCUMENTS

| | | |
|---|---|---|
| 7,421,498 B2 | 9/2008 | Packer |
| 7,422,115 B2 | 9/2008 | Zager et al. |
| 7,428,576 B2 | 9/2008 | Suster |
| 7,457,844 B2 | 11/2008 | Miller et al. |
| 7,493,403 B2 | 2/2009 | Shull et al. |
| 7,511,723 B2 | 3/2009 | Sylthe et al. |
| 7,519,674 B2 | 4/2009 | Regnier |
| 7,523,095 B2 | 4/2009 | Gates et al. |
| 7,548,956 B1 | 6/2009 | Aoki et al. |
| 7,580,984 B2 | 8/2009 | Malik |
| 7,584,426 B2 | 9/2009 | Chang et al. |
| 7,599,992 B2 | 10/2009 | Nakajima |
| 7,640,322 B2 | 12/2009 | Wendkos et al. |
| 7,694,128 B2 | 4/2010 | Judge et al. |
| 7,707,218 B2 | 4/2010 | Gocht et al. |
| 7,707,255 B2 | 4/2010 | Satterfield et al. |
| 7,711,743 B2 | 5/2010 | Cavagnaro et al. |
| 7,716,297 B1 | 5/2010 | Wittel et al. |
| 7,725,544 B2 | 5/2010 | Alspector et al. |
| 7,734,670 B2 | 6/2010 | Poozhiyil et al. |
| 7,779,079 B2 | 8/2010 | Nichols et al. |
| 7,779,472 B1 | 8/2010 | Lou |
| 7,797,733 B1 | 9/2010 | Sallam |
| 7,831,707 B2 | 11/2010 | Bardsley |
| 7,844,678 B2 | 11/2010 | Malik |
| 7,849,103 B2 | 12/2010 | Hyatt et al. |
| 7,877,806 B2 | 1/2011 | Repasi et al. |
| 7,882,189 B2 | 2/2011 | Wilson et al. |
| 7,882,542 B2 | 2/2011 | Neystadt et al. |
| 7,921,174 B1 | 4/2011 | Denise |
| 7,930,353 B2 | 4/2011 | Chickering et al. |
| 7,934,254 B2 | 4/2011 | Graham |
| 8,024,266 B1 | 9/2011 | Barker |
| 8,042,149 B2 | 10/2011 | Judge |
| 8,069,481 B2 | 11/2011 | Judge |
| 8,095,612 B2 | 1/2012 | Cowan et al. |
| 8,141,133 B2 | 3/2012 | Pagan |
| 8,171,388 B2 | 5/2012 | Zaltzman et al. |
| 8,180,834 B2 | 5/2012 | Kay et al. |
| 8,214,437 B1 | 7/2012 | Alspector et al. |
| 8,255,468 B2 | 8/2012 | Vitaldevara et al. |
| 8,306,256 B2 | 11/2012 | Muriello et al. |
| 8,312,096 B2 | 11/2012 | Cohen et al. |
| 8,321,616 B2 | 11/2012 | Lambert et al. |
| 8,423,458 B2 | 4/2013 | Barber |
| 8,452,715 B2 | 5/2013 | Barber |
| 2001/0049725 A1 | 12/2001 | Kosuge |
| 2002/0083140 A1 | 6/2002 | Shin et al. |
| 2002/0133557 A1 | 9/2002 | Winarski |
| 2002/0143784 A1 | 10/2002 | Sluiman |
| 2004/0071090 A1 | 4/2004 | Corson et al. |
| 2004/0122926 A1 | 6/2004 | Moore et al. |
| 2005/0004989 A1 | 1/2005 | Satterfield et al. |
| 2005/0030643 A1 | 2/2005 | Gal et al. |
| 2005/0050150 A1 | 3/2005 | Dinkin |
| 2005/0060643 A1 | 3/2005 | Glass et al. |
| 2005/0086166 A1* | 4/2005 | Monk et al. ............ 705/41 |
| 2005/0182735 A1 | 8/2005 | Zager et al. |
| 2006/0085504 A1 | 4/2006 | Yang et al. |
| 2006/0168029 A1 | 7/2006 | Fitzpatrick et al. |
| 2006/0174201 A1 | 8/2006 | Zaner-godsey et al. |
| 2007/0016609 A1 | 1/2007 | Kim et al. |
| 2007/0073630 A1* | 3/2007 | Greene et al. ............ 705/80 |
| 2007/0156732 A1 | 7/2007 | Surendran et al. |
| 2007/0156886 A1 | 7/2007 | Srivastava |
| 2007/0192855 A1 | 8/2007 | Hulten et al. |
| 2008/0028465 A1 | 1/2008 | Bantz et al. |
| 2008/0082662 A1 | 4/2008 | Dandliker et al. |
| 2008/0189162 A1 | 8/2008 | Ganong et al. |
| 2008/0256211 A1 | 10/2008 | Shimizu |
| 2008/0271143 A1 | 10/2008 | Stephens et al. |
| 2008/0307038 A1 | 12/2008 | Nichols et al. |
| 2009/0006366 A1 | 1/2009 | Johnson et al. |
| 2009/0013041 A1 | 1/2009 | Farmer et al. |
| 2009/0044264 A1 | 2/2009 | Ramanathan et al. |
| 2009/0077383 A1 | 3/2009 | de Monseignat et al. |
| 2009/0125600 A1 | 5/2009 | Fitzpatrick et al. |
| 2009/0157830 A1 | 6/2009 | Kim |
| 2009/0210391 A1 | 8/2009 | Hall et al. |
| 2009/0282265 A1 | 11/2009 | Aissi et al. |
| 2009/0327006 A1* | 12/2009 | Hansan et al. ............ 705/7 |
| 2009/0328008 A1 | 12/2009 | Mital et al. |
| 2009/0328209 A1 | 12/2009 | Nachenberg |
| 2010/0004965 A1* | 1/2010 | Eisen ............ 705/7 |
| 2010/0024739 A1 | 2/2010 | Bakker |
| 2010/0057895 A1 | 3/2010 | Huang |
| 2010/0058058 A1 | 3/2010 | Busari |
| 2010/0094767 A1* | 4/2010 | Miltonberger ............ 705/325 |
| 2010/0115040 A1 | 5/2010 | Sargent et al. |
| 2010/0125897 A1 | 5/2010 | Jain et al. |
| 2010/0142401 A1 | 6/2010 | Morris |
| 2010/0153325 A1 | 6/2010 | Amoroso et al. |
| 2010/0191819 A1 | 7/2010 | Alspector et al. |
| 2010/0205254 A1 | 8/2010 | Ham |
| 2010/0205259 A1 | 8/2010 | Vitaldevara et al. |
| 2010/0205665 A1 | 8/2010 | Komili et al. |
| 2010/0211997 A1 | 8/2010 | McGeehan et al. |
| 2010/0235367 A1 | 9/2010 | Chitiveli et al. |
| 2010/0235447 A1 | 9/2010 | Goodman et al. |
| 2010/0235625 A1 | 9/2010 | Pandey |
| 2010/0241739 A1 | 9/2010 | Reus et al. |
| 2010/0277997 A1 | 11/2010 | Kim |
| 2010/0318611 A1 | 12/2010 | Curtin et al. |
| 2010/0332428 A1 | 12/2010 | Mchenry et al. |
| 2011/0010304 A1 | 1/2011 | Chan Wong et al. |
| 2011/0047618 A1 | 2/2011 | Evans et al. |
| 2011/0131085 A1 | 6/2011 | Wey |
| 2011/0131131 A1* | 6/2011 | Griffin et al. ............ 705/38 |
| 2011/0191847 A1 | 8/2011 | Davis et al. |
| 2011/0191849 A1 | 8/2011 | Jayaraman et al. |
| 2011/0258264 A1 | 10/2011 | Bremner et al. |
| 2011/0264663 A1* | 10/2011 | Verkasalo ............ 707/740 |
| 2011/0296003 A1* | 12/2011 | McCann et al. ............ 709/224 |
| 2012/0028606 A1 | 2/2012 | Bobotek |
| 2012/0079099 A1 | 3/2012 | Dhara et al. |
| 2012/0116559 A1 | 5/2012 | Davis et al. |
| 2012/0134548 A1 | 5/2012 | Rhoads et al. |
| 2012/0166179 A1 | 6/2012 | Tirumalachetty et al. |
| 2012/0166533 A1 | 6/2012 | Rubinstein et al. |
| 2012/0198010 A1 | 8/2012 | Bremnet et al. |
| 2012/0296965 A1 | 11/2012 | Srivastava |
| 2012/0297484 A1 | 11/2012 | Srivastava |
| 2013/0007152 A1 | 1/2013 | Alspector et al. |
| 2013/0018964 A1 | 1/2013 | Osipkov et al. |
| 2013/0018965 A1 | 1/2013 | Ramachandran et al. |
| 2013/0018972 A1 | 1/2013 | Sargent et al. |
| 2013/0036466 A1 | 2/2013 | Penta et al. |

OTHER PUBLICATIONS

Martin, et al., "Analyzing Behaviorial Features for Email Classification", Retrieved at << http://citeseerx.ist.psu.edu/viewdoc/download?doi=10.1.1.83.5285&rep=rep1&type=pdf >>,vol. 3 No. 2, Jul. 21, 2005, pp. 8.

Segal, et al., "MailCat: An Intelligent Assistant for Organizing E-Mail", Retrieved at << http://citeseerx.ist.psu.edu/viewdoc/download?doi=10.1.1.65.7439&rep=rep1&type=pdf >>, In Proceedings of the Third International Conference on Autonomous Agents, vol. 22 No. 4, 1999, pp. 8.

"G-Lock Email Processor 1.96", Retrieved at << http://www.freedownloadmanager.org/downloads/parse-incoming-mime-email-835962.html >>, Nov. 10, 2005, pp. 3.

Guan, et al., "Anomaly Based Malicious URL Detection in Instant Messaging", Retrieved at <<http://jwis2009.nsysu.edu.tw/location/paper/Anomaly%20Based%20Malicious%20URL%20-Detection%20in%20Instant%20Messaging.pdf>>, The Fourth Joint Workshop on Information Security(JWIS), Aug. 6-7, 2009, pp. 1-14.

Gianvecchio, et al., "Measurement and Classification of Humans and Bots in Internet Chat", Retrieved at <<http://www.cs.wm.edu/~hnw/paper/security08.pdf>>, Proceedings of the 17th conference on Security symposium, 2008, pp. 15.

(56) References Cited

OTHER PUBLICATIONS

Bi, et al., "A Trust and Reputation based Anti-SPIM Method", Retrieved at <<http://ieeexplore.ieee.org/stamp/stamp.jsp?tp=&arnumber=4509914>>, IEEE INFOCOM. The 27th Conference on Computer Communications. Apr. 13-18, 2008, pp. 371-375.

Trivedi, et al., "Analyzing Network and Content Characteristics of SPIM using Honeypots", Retrieved at <<http://www.trustedsource.org/download/research_publications/trivedi.pdf>>, Proceedings of the 3rd USENIX workshop on Steps to reducing unwanted traffic on the internet, 2007, pp. 9.

Ramaraj, et al., "Automated Classification of Customer Emails via Association Rule Mining", Retrieved at <<http://www.scialert.net/qredirect.php?doi=itj.2007.567.572&linkid=pdf>>, Information Technology Journal 6(4), 2007, pp. 567-572.

Xia, et al., "An Agent for Semi-automatic Management of Emails", http://www.cs.cityu.edu.hk/~liuwy/publications/EmailAgent_APCHI.pdf, Dept. of Computer Science & Technology, Tsinghua University, Beijing 100084, China Dept. of Computer Science, City University of Hong Kong, Hong Kong SAR, China, pp. 1-8.

Cignini, et al., "E-Mail on the Move: Categorization, Filtering, and Alerting on Mobile Devices with the ifMail Prototype", Retrieved at <<http://www.springerlink.com/content/9ewve0vp3e7xq6ft/fulltext.pdf>>, Mobile and Ubiquitous Info. Access Ws 2003, LNCS 2954, 2004, pp. 107-123.

"Microsoft Outlook 2007 Managing Email with Folders", Retrieved at <<http://lis.dickinson.edu/Technology/Training/Tutorials/ms2007/outlook_folders.pdf>>, pp. 5.

Yang, et al., "Email Categorization Using Fast Machine Learning Algorithms", Retrieved at <<http://www.springerlink.com/content/cvjuxvrjl1qtwe4v/fulltext.pdf>>, DS 2002, LNCS 2534, 2002, pp. 316-323.

"Improved network security with IP and DNS reputation"—Published Date: Jul. 2010 http://resources.idgenterprise.com/original/AST-0007839_IP_and_DNS_reputation_white_paper_-_4AA2-3535ENW.pdf.

Kwan "Trend Micro™ Smart Protection Network Web Reputation Service Architectural Overview"—Published Date: Nov. 2009 http://trendedge.trendmicro.com/pr/tm/te/document/SPN_and_WRS_Architecture_Overview_091112.pdf.

"Spam and Malware Protection"—Retrieved Date: Apr. 18, 2011 http://blog.bit.ly/post/263859706/spam-and-malware-protection.

"ThreatWatch™ IP Reputation Service from Security On-Demand"—Retrieved Date: Apr. 18, 2011 http://www.securityondemand.com/main/SolutionCenter/ThreatWatch.htm.

"ipTrust Unveils New IP Reputation Intelligence Service"—Retrieved Date: Apr. 18, 2011 http://www.securityweek.com/iptrust-unveils-new-ip-reputation-intelligence-service.

Costa, et al., "Extending Security-by-Contract with Quantitative Trust on Mobile Devices"—Published Date: Feb. 15-18, 2010 http://hal.archives-ouvertes.fr/docs/00/53/67/05/PDF/IMIS10.pdf.

Qian, et al., "Ensemble: Community-based anomaly detection for popular applications"—Published Date: Sep. 14-18, 2009 http://www.cse.umich.edu/~zmao/Papers/ensemble.pdf.

"Bridging the Gap between Data-Flow and Control-Flow Analysis for Anomaly Detection"—Published Date: Dec. 8-12, 2008 http://ieeexplore.ieee.org/stamp/samp.jsp?tp=&arnumber=4721575.

"Intrusion Detection via Static Analysis"—Published Date: May 14-16, 2001 http://ieeexplore.ieee.org/stamp/stamp.jsp?tp=&arnumber=924296.

"IE8 Security Part III: SmartScreen® Filter"—Retrieved Date: Apr. 15, 2011 http:/blogsmsdncombiearchive/2008/07/02/ie8-security-part-iii-sm"artscreen-filter.aspx.

Non-Final Office Action Cited in Related U.S. Appl. No. 12/402,735 Dated Oct. 18, 2010.

Final Office Action Cited in Related U.S. Appl. No. 12/402,735 Dated Mar. 30, 2011.

Non-Final Office Action Cited in Related U.S. Appl. No. 12/402,735 Dated Jun. 23, 2011.

Benevenuto, et al., "Detecting Spammers on Twitter", Retrieved at <<http://ceas.cc/2010/papers/Paper%2021.pdf>>, Seventh Annual Collaboration Electronic Messaging, Anti-Abuse and Spam Conference, Jul. 13-14, 2010, pp. 9.

Xie, et al., "HoneyIM: Fast Detection and Suppression of Instant Messaging Malware in Enterprise-like Networks", Retrieved at <<http://www.foo.be/cours/dess-20072008/papers/154.pdf>>, Dec. 10-14, 2007, pp. 10.

Mayes, Brandon David, "Defending Against Malware in Online Social Networks", Retrieved at <<http://repository.lib.ncsu.edu/ir/bitstream/1840.16/6400/1/etd.pdf>>, 2010, pp. 65.

Aimeur, et al., "Towards a Privacy-enhanced Social Networking Site", Retrieved at <<http://ieeexplore.ieee.org/stamp/stamp.jsp?tp=&arnumber=5438097>>, International Conference on Availability, Reliability and Security, Feb. 15-18, 2010, p. 172-179.

Fong, Philip W.L., "Preventing Sybil Attacks by Privilege Attenuation: A Design Principle for Social Network Systems", Retrieved at <<http://pages.cpsc.ucalgary.ca/~pwlfong/Pub/sp2011.pdf>>, Dec. 1, 2010, pp. 16.

Xu, et al., "Resisting Sybil Attack by Social Network and Network Clustering", Retrieved at <<http://ieeexplore.ieee.org/stamp/stamp.jsp?tp=&arnumber=5598178>>, Proceedings of the 10th Annual International Symposium on Applications and the Internet, Jul. 19-23, 2010, p. 15-21.

Wondracek, et al., "A Practical Attack to De-Anonymize Social Network Users", Retrieved at <<http://www.iseclab.org/papers/sonda-tr.pdf>>, Feb. 1, 2011, pp. 15.

Mislove, et al., "Ostra: Leveraging trust to thwart unwanted communication", Retrieved at <<http://www.mpi-sws.org/~gummadi/papers/ostra.pdf>>, Oct. 15, 2007, pp. 16.

Leung, et al., "Implementation of a Focused Social Networking Crawler", Retrieved at <<http://courses.ece.ubc.ca/412/term_project/reports/2009/focused_social_net_crawler.pdf>>, Retrieved Date: Apr. 14, 2011, pp. 1-6.

Reply Non-Final Office Action cited in U.S. Appl. No. 12/402,735 dated Jan. 18, 2011, 13 pgs.

Reply Final Office Action cited in U.S. Appl. No. 12/402,735 dated Jun. 6, 2011, 16 pgs.

Reply Non-Final Office Action cited in U.S. Appl. No. 12/402,735 dated Sep. 23, 2011, 15 pgs.

Final Office Action cited in U.S. Appl. No. 12/402,735 dated Jan. 9, 2012, 18 pgs.

Reply Final Office Action cited in U.S. Appl. No. 12/402,735 dated Apr. 9, 2012, 17 pgs.

Non-Final Office Action cited in U.S. Appl. No. 12/402,735 dated Aug. 30, 2012, 16 pgs.

Reply Non-Final Office Action cited in U.S. Appl. No. 12/402,735 dated Nov. 30, 2012, 15 pgs.

Notice of Allowance cited in U.S. Appl. No. 12/402,735 dated Apr. 29, 2013, 17 pgs.

Notice of Allowance cited in U.S. Appl. No. 12/402,735 dated Sep. 6, 2013, 14 pgs.

Non-Final Office Action cited in U.S. Appl. No. 13/180,877 dated Apr. 1, 2013, 23 pgs.

Reply Non-Final Office Action cited in U.S. Appl. No. 13/180,877 dated Jul. 1, 2013, 17 pgs.

Non-Final Office Action cited in U.S. Appl. No. 13/110,174 dated Oct. 9, 2012, 13 pgs.

Reply Non-Final Office Action cited in U.S. Appl. No. 13/110,174 dated Jan. 9, 2013, 13 pgs.

Final Office Action cited in U.S. Appl. No. 13/110,174 dated May 10, 2013, 13 pgs.

Reply Final Office Action cited in U.S. Appl. No. 13/110,174 dated Aug. 12, 2013, 12 pgs.

Non-Final Office Action cited in U.S. Appl. No. 13/195,245 dated Dec. 28, 2012, 35 pgs.

Reply Non-Final Office Action cited in U.S. Appl. No. 13/195,245 dated Mar. 28, 2012, 14 pgs.

Final Office Action cited in U.S. Appl. No. 13/195,245 dated May 10, 2013, 41 pgs.

Reply Final Office Action cited in U.S. Appl. No. 13/195,245 dated Aug. 12, 2013, 16 pgs.

(56) References Cited

OTHER PUBLICATIONS

Non-Final Office Action cited in U.S. Appl. No. 13/180,838 dated Jun. 18, 2013, 30 pgs.
Wikipedia (Jul. 14, 2011). Uniform Resource Locator, reprinted from the Internet at: http://en.wikipedia.org, 4 pgs.
Macaulay, IAnewsletter, 2010, 47 pgs.
Notice of Allowance cited in U.S. Appl. No. 12/402,735 dated Dec. 16, 2013, 8 pgs.
Final Office Action cited in U.S. Appl. No. 13/180,877 dated Oct. 24, 2013, 24 pgs.
Reply Final Office Action cited in U.S. Appl. No. 13/180,877 dated Jan. 24, 2014, 15 pgs.
Non-Final Office Action cited in U.S. Appl. No. 13/110,174 dated Jun. 6, 2014, 12 pgs.
Non-Final Office Action cited in U.S. Appl. No. 13/195,245 dated Sep. 13, 2013, 52 pgs.
Reply Non-Final Office Action cited in U.S. Appl. No. 13/195,245 dated Dec. 13, 2013, 14 pgs.
Final Office Action cited in U.S. Appl. No. 13/195,245 dated Dec. 20, 2013, 49 pgs.
Reply Final Office Action cited in U.S. Appl. No. 13/195,245 dated Mar. 20, 2014, 13 pgs.
Non-Final Office Action cited in U.S. Appl. No. 13/195,245 dated Apr. 4, 2014, 28 pgs.
Reply Non-Office Action cited in U.S. Appl. No. 13/195,245 dated Aug. 4, 2014, 11 pgs.
Final Office Action cited in U.S. Appl. No. 13/195,245 dated Aug. 15, 2014, 47 pgs.
Final Office Action cited in U.S. Appl. No. 13/180,838 dated Oct. 16, 2013, 29 pgs.
Reply Final Office Action cited in U.S. Appl. No. 13/180,838 dated Jan. 16, 2013, 24 pgs.
Non-Final Office Action cited in U.S. Appl. No. 13/180,838 dated Jan. 29, 2014, 48 pgs.
Reply Non-Final Office Action cited in U.S. Appl. No. 13/180,838 dated Apr. 29, 2014, 29 pgs.
Notice of Allowance cited in U.S. Appl. No. 13/180,838 dated Jun. 9, 2014, 41 pgs.
Non-Final Office Action cited in U.S. Appl. No. 13/205,136 dated Nov. 7, 2013, 35 pgs.
Reply Non-Final Office Action cited in U.S. Appl. No. 13/205,136 dated Mar. 7, 2014, 13 pgs.
Reply Non-Final Office Action cited in U.S. Appl. No. 13/110,174 dated Sep. 8, 2014, 12 pgs.
Final Office Action cited in U.S. Appl. No. 13/110,174 dated Jan. 5, 2015, 13 pgs.
Reply Non-Final Office Action cited in U.S. Appl. No. 13/180,838 dated Sep. 18, 2013, 12 pgs.
Notice of Allowance cited in U.S. Appl. No. 13/180,838 dated Oct. 7, 2014, 22 pgs.
Final Office Action cited in U.S. Appl. No. 13/205,136 dated May 22, 2014, 29 pgs.
Reply Final Office Action cited in U.S. Appl. No. 13/205,136 dated Sep. 17, 2014, 14 pgs.
Notice of Allowance cited in U.S. Appl. No. 13/205,136 dated Oct. 30, 2014, 13 pgs.
Notice of Allowance cited in U.S. Appl. No. 13/205,136 dated Feb. 13, 2015, 17 pgs.
"Priority Inbox", sorts important e-mail for you, Jacqui Chang, Aug. 30, 2010, Ars Technics, reprinted from the Internet at: htt; \p://arstechnicz.com/business/2010/08/gamil-aims-to-learn-from-you-sort-important-e-mail-to-top/, 2 pgs.
"Optimum Tuning of Defense Settings for Common Attacks on the Web Applications", Dwen-Ren Tsai, Allen Y. Chang, Peishi Liu and Hsuan-Chang Chen, 2009, Security Technology, 2009, 43rd Annual 2009 International Carnahan Conference on DOI: 10.1109/CCST.2009.5335560, pp. 89-94.
"Sender Reputation in a Large Webmail Service", Bradley Taylor, Jul. 2006, CEAS 2006 Third Conference on Email and AntiSpam, reprinted from the Internet at: http://www.ceas.cc/2006/19.pdf, 6 pgs.
"Runtime Estimations, Reputation and Elections for Top Performing Distributed Query Scheduling", Rogerio Luis, De Carvalho Costa and Pedro Furtado, 2009, Cluster Computing and the Grid, 2009, CCGRIS '09, 9th IEEE/ACM International Symposium on DOI: 10.1109/CCGRID.2009.34, pp. 28-35.

* cited by examiner

FIG. 6

DETECTING A COMPROMISED ONLINE USER ACCOUNT

BACKGROUND

In a computing environment, online services can comprise social networking, web-based email, cloud-based storage and application use, content aggregation services, as well as blogging and micro-blogging services, just to name a few. Further, some online service providers aggregate several of these service together and/or aggregate their service with those of other providers. Users of online services typically open an account that is linked to the online service, such as a social network, which may comprise some sort of authentication (e.g., using shared secrets and/ or security information). Unauthorized users (e.g., malicious hackers) occasionally hijack a user's online account by breaking the authentication (e.g., stealing or figuring out the security information), and may use the account for malicious purposes (e.g., spamming, transferring malicious code, vandalism, hijacking other accounts linked to the user, etc.)

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A significant number of people have an online presence in one or more professional or personal social networks, content aggregation services, email/communication accounts and/or cloud-based service accounts, for example. Compromising of a user's accounts not only takes away control from the user, it may damage their online identity/reputation, it can create an online threat for the users network and/or may result in the compromising of the user's social network contacts. Currently, when an online user's account is hijacked, the user may not find out until it is too late to do anything about it. For example, the hijacker can take over the account, change log-in and security information, and begin performing malicious acts, such as attempting to hijack user contacts.

Detecting compromised user accounts and providing notification to the user and user contacts in a social network, for example, may allow the users and contacts to mitigate damage to the network, and to have a clean, safe online experience. Accordingly, one or more techniques and/or systems are disclosed that may detect a compromised user account, and notify the user and/or user contacts of the potential threat, thereby allowing them to take action(s) to mitigate the problem. When a user account is hijacked, for example, the use of resources associated with the account typically changes dramatically, for example. In this example, these dramatic changes may be used to detect the compromised account, and to send out an appropriate notice to the user, and possibly the user's contacts.

In one embodiment for mitigating a compromised online user account, a baseline for the online user account can be established, such as from a period where the account is known not to be compromised. Further, a deviation from the baseline that is indicative of a potentially compromised online user account can be detected, by monitoring of the online user account. Additionally, upon detection of the indication, the user of the online user account can be notified of the potential that their account may be compromised.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for detecting a potential compromised user account, such as an online social network account, and providing a way for the user of the account to mitigate the potential compromised account. Further, because an online user account is typically linked to one or more contacts (e.g., social network connections/friends), the method may provide a way for the contacts of the user account to mitigate their accounts being compromised (e.g., or further compromised). Monitoring the user account for potential undesired or malicious activity, and notifying the user of a potential compromised state so that the user can mitigate a potential problem, may allow the user to have an enhanced (e.g., clean and safe) online experience.

Figure 1:
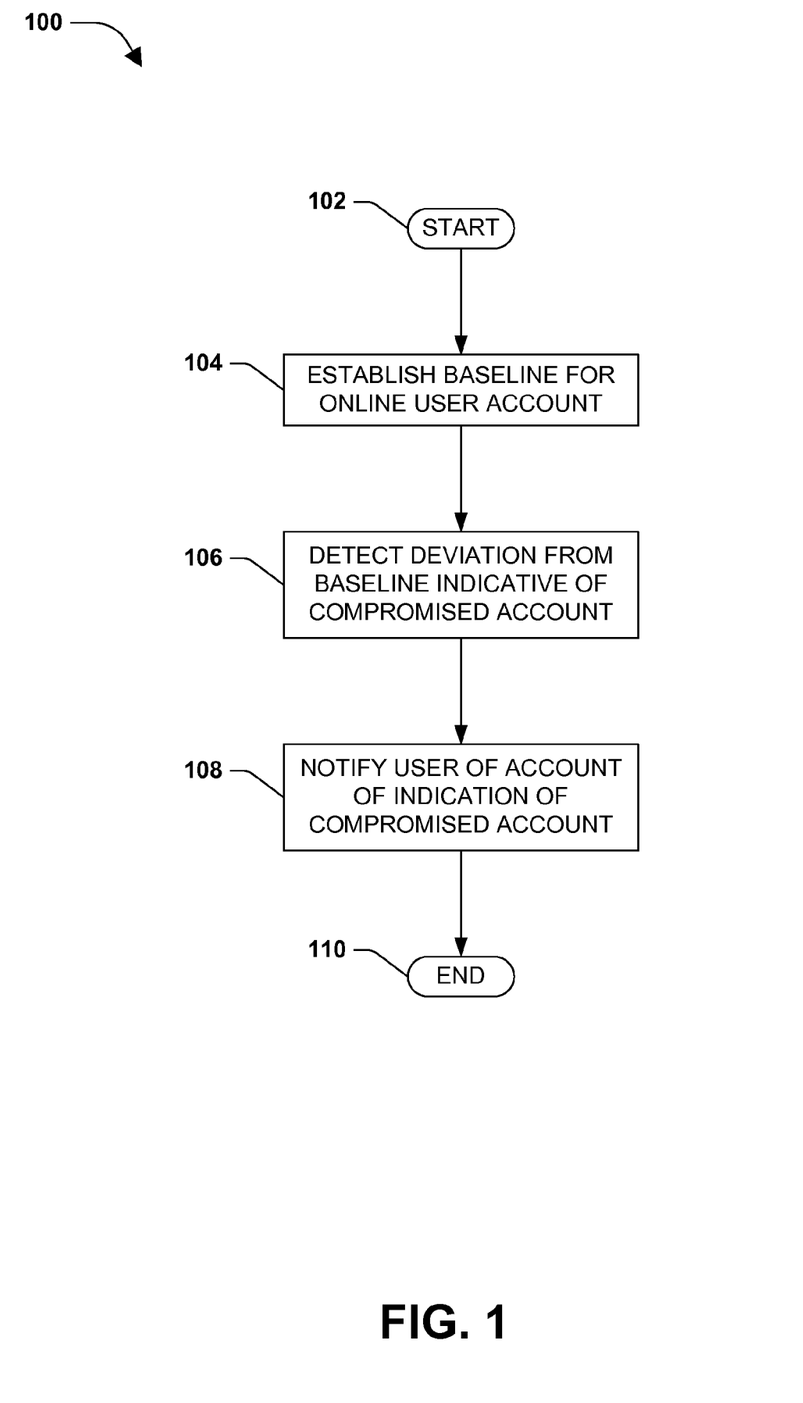
FIG. 1 is a flow diagram illustrating an example embodiment for mitigating a compromised online user account.

FIG. 1 is a flow diagram illustrating an example embodiment 100 for mitigating a compromised online user account. The exemplary method 100 begins at 102 and involves establishing a baseline for the online user account, at 104. In one embodiment, the online user account can comprise an online social network account, such as provided by one or more social network providers, which may aggregate content from a plurality of contacts (e.g., friends) connected to the user over one or more service accounts.

For example, a first online social network provider can allow a user to set up an account, and the user can connect with other users who also have an account with the same service provider. Further, a second social network provider may allow the user to aggregate information from one or more first online social network providers as well as from the second social network provider. In this way, for example, the users social network account may comprise contacts and aggregated information from more than one online social network provider.

A baseline for the users online user account can comprise data that indicates typical use of resources associated with the account by the user. For example, resources associated with the account may comprise communication tools, such as email, message boards, instant messaging (IM), video chat, updating a micro-blog stream, and/or commenting on postings to the social network. Other resources may comprise establishing contact relationships, uploading content, and/or sending content to contacts, for example. In one embodiment, the baseline can be established at a desired interval (e.g., after one week of account initiation), for example, so as to comprise enough data to establish an effective baseline. Further, the baseline may be continually updated to reflect normal usage pattern changes of the account by the user.

Further, the respective resources associated with the account may have one or more variables, for example, for which a baseline (e.g., alone or in combination with others) may be established. For example, baseline data may be established for a number of times (e.g., frequency) the user sends/initiates messages to contacts, which may further be broken down into data for respective types of communications (e.g., email, IM, etc.). As another example, baseline data may be established for a number and/or frequency of requests sent to establish a new contact (e.g., sending a contact/friend request), a number and/or size of content uploaded, and/or a number and/or size of content sent to (e.g., particular) contacts of the account, for example.

At 106 in the exemplary method 100, a deviation from the baseline is detected that comprises an indication of a potentially compromised online user account. In one embodiment, if a deviation (e.g., a transformation in account resource use) from the baseline for the user account is detected, the deviation may be compared against a threshold to determine if the deviation comprises an indication of a potentially compromised user account. In one embodiment, the threshold may be determined empirically (e.g., by observing what happens to a user account when it is hijacked), through machine learning (e.g., training a classifier to detect a compromised account), and/or some other technique(s).

A compromised user account may occur when a users account is hijacked (e.g., taken over) by an unauthorized user (e.g., a malicious hacker), who uses the account for unauthorized purposes (e.g., vandalism of the account or users reputation; purchasing; and/or sending spam, viruses, and/or Trojan horses; etc.). An unauthorized user may hijack an account by acquiring one or more portions of the users secret authentication information, for example. The acquired information can be used to log onto the account and change the authentication information (e.g., change a password and/or security information), such that the user may not be able to log back into the account (e.g., to shut down undesired behavior).

At 108 in the exemplary method 100, the user of the online user account is notified of the detected indication of the potentially compromised online user account. In one embodiment, the user may be notified by a means that is not associated with the compromised user account. For example, if a users email account is compromised, an alternate means of communication (e.g., IM, video chat, texting, alternate email account) may be used that is not associated with the username for the user's (compromised) email account. In this way, in this embodiment, the user may be able to mitigate the compromised nature of the users online account, and/or mitigate propagation of the unauthorized use to contacts of the users online account. Also, after the user receives the notification from 108, the user may investigate and determine that the account is not, in fact, compromised. For example, some setting may have been inadvertently changed causing a deviation from the baseline, that is innocuous rather than malicious.

Having notified the user of the indication of the potentially compromised account, the exemplary method 100 ends at 110.

Figure 2:
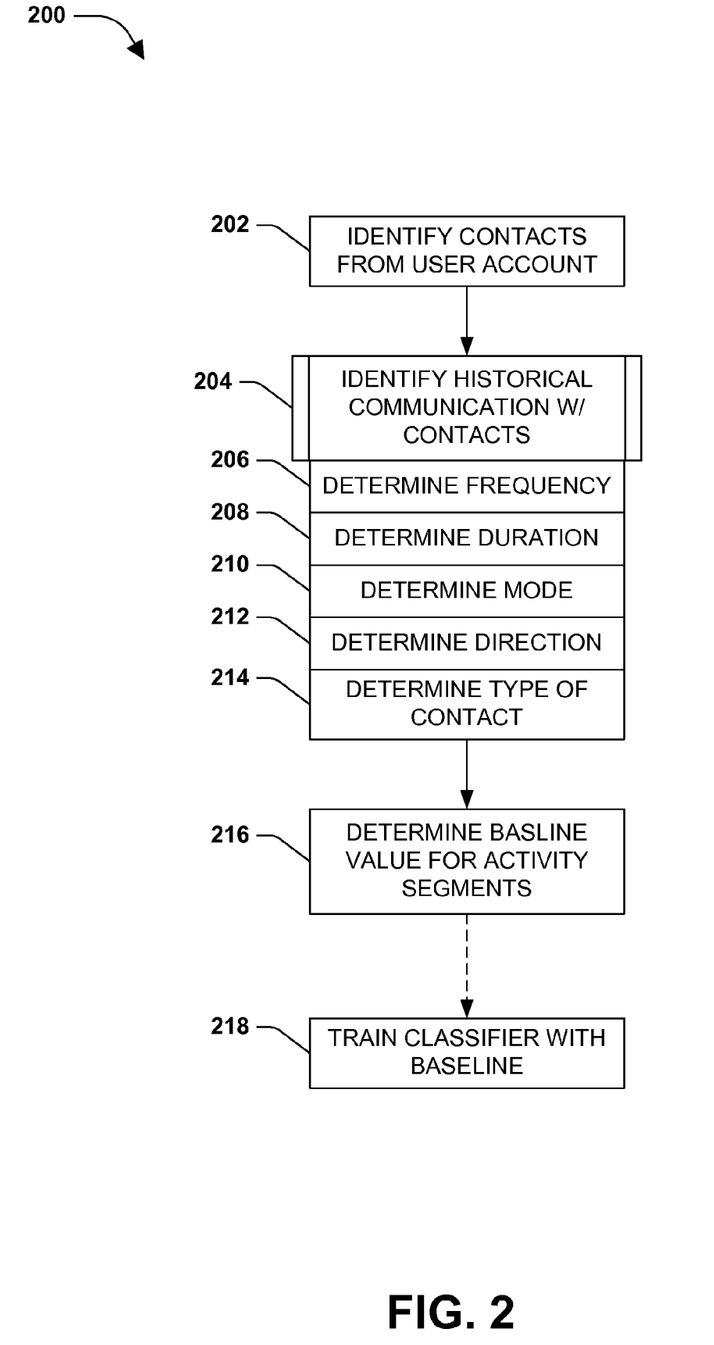
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. In one embodiment, establishing the baseline can comprise identifying activity in one or more activity segments (e.g., resources used for the account) for the online user account. One of the most common activities associated with a user's online account comprises communication-related activity between the user and one or more contacts for the account. Communication can comprise sending or receiving a message to/from one or more contacts, and/or broadcasting information (e.g., posting a link, blogging, and micro-blogging) to a social network or online service.

Accordingly, at 202, contacts associated with an online user account can be identified. For example, in order to establish a baseline for communication activity segments associated with the user's account, the user's contacts may need to be identified. In one embodiment, anonymous information may be identified for the user's contacts, such as an IP address, or range of IP addresses, and/or an anonymous contact ID. In one embodiment, a number of contacts and type of contact can comprise data used to establish the baseline. For example, when a users account is compromised, empirical evidence often shows a large spike in a number of new contacts added to the account, which may be evidence of a compromised account.

In one embodiment, establishing the baseline can comprise determining historical use of the online user account by the user for a desired period of time. Accordingly, at 204, historical communication between the user and the contacts can be identified. For example, when determining the baseline for the user account a particular communication-related activity (e.g., new friend requests) from a particular period of time, such as the previous week, month, year, may be mined. Further, identifying historical communication-related activity can comprise mining data from one or more activity segments related to communication.

At 206, activity related to a frequency of communication can be identified. Communication frequency may comprise how often a user communicates with contacts from the account, and/or how often the contacts communicate with the user. For example, empirical evidence suggests that communication frequency in a social network can increase dramatically when a user account is compromised.

At 208, activity related to a duration of communications can be identified. Duration of communications can comprise how long a conversation, chat, send/response occurrence lasts. For example, when using IM or texting for communication, a user and contact may send messages back and forth during a chat or conversation, which can be identified as a duration of communication. As another example, a user's email length, or send/response to an email chain can be identified as a duration of communication. For example, empirical evidence suggests that a duration of a communication may be significantly shorter when an online user account is compromised.

At 210, activity related to a mode of communications can be identified. Modes of communications may comprise email messaging, instant messaging (IM), text messaging, voice messaging, video messaging or chatting, posting to a message board, posting a comment to online content, posting an update to a status stream, uploading content to an online service, micro-blogging on an online service, and blogging using an online service, among others.

Further, different modes of communication may respectively comprise different trust levels. For example, a video and/or a voice message may have a high trust level, as an identity of the contact can more easily be confirmed. As another example, an IM may have a lower level of trust than a video message, as it may be more difficult to confirm an identity of the sender. However, the IM may have a higher level of trust than a posting to a message board, as the posting is typically a one way communication. Empirical evidence suggests that a number of communications utilizing a communication mode that has a lower trust level often increase when an online user account is compromised. For example, video and voice messaging or chatting will typically be eliminated when an account is compromised, and emailing, posting, and IM often increase in frequency.

At 212, activity related to a direction of communications can be identified. For example, the user can send or broadcast communications to contacts, and the user may receive communications from contacts. Typical communication activity for a user account may comprise a mix of sending and receiving communications in different proportions. Empirical evidence suggests that when a user account is compromised, for example, the attacker will usually just push communications out to contacts, and then move on to another venture. In this example, the empirical evidence would suggest that the proportion of communication direction will change significantly (e.g., to much more sending).

At 214, activity related to a type of contact associated with the communications can be identified. For example, contacts linked to the online user account may be grouped by age, such as how long they have been linked to the account. As another example, communications may be sent from the online user account to contacts linked to the network associated with the account (e.g., friends in the user's account, or contacts in the user's address book/contact list). Further, for example, communications can be sent to contacts that are not from the user account (e.g., addresses that are not linked to the user's social network, or are not found in the user's online address book/contact list). Empirical evidence suggests that a frequency of non-network communications (e.g., communications to entities with which the user does not have an existing online relationship) increases when an account is compromised.

In one embodiment, the historical activities related to the communication activity segments described above (e.g., and/or others) can be identified, for example, and used to create a typical use profile for the online user account. In this embodiment, this profile may be used to generate a baseline for the account.

At 216, a baseline value may be generated for identified activity segments. In one embodiment, a baseline value may be determined for the respective identified activity segments, and/or a baseline value may be determined for combination of one or more of the activity segments indentified for the online user account.

For example, a ratio value may be identified for outgoing versus incoming communications, a percentage value may be identified for respective modes of communications used by the user of the account, and/or an average (e.g., median or some other statistic) duration value may be identified for the account. Baseline values may also be developed for combinations of activity segments, for example, such as a percentage of outgoing messages to non-network contacts, and a percentage (frequency) of incoming messages using email.

In one embodiment, at 218 in the example embodiment 200, the baseline data (e.g., values) may be used to train a classifier to identify a deviation from the baseline, and/or identify a potential compromised online user account. For example, a trained classifier can be used to classify input data, such as from an activity segment (e.g., account communications), to generate an output classification of the data (e.g., a deviation, a probability of being compromised).

The classifier can be trained over sets of data having a known classification, such as by training over a set of communication frequencies of outgoing emails that are known to be associated with a compromised account; and over sets of known baseline data for the account. In this way, for example, the trained classifier can assign a probability to input data, where the probability may identify no deviation, a deviation, and/or deviation comprising a potentially compromised account.

Figure 3:
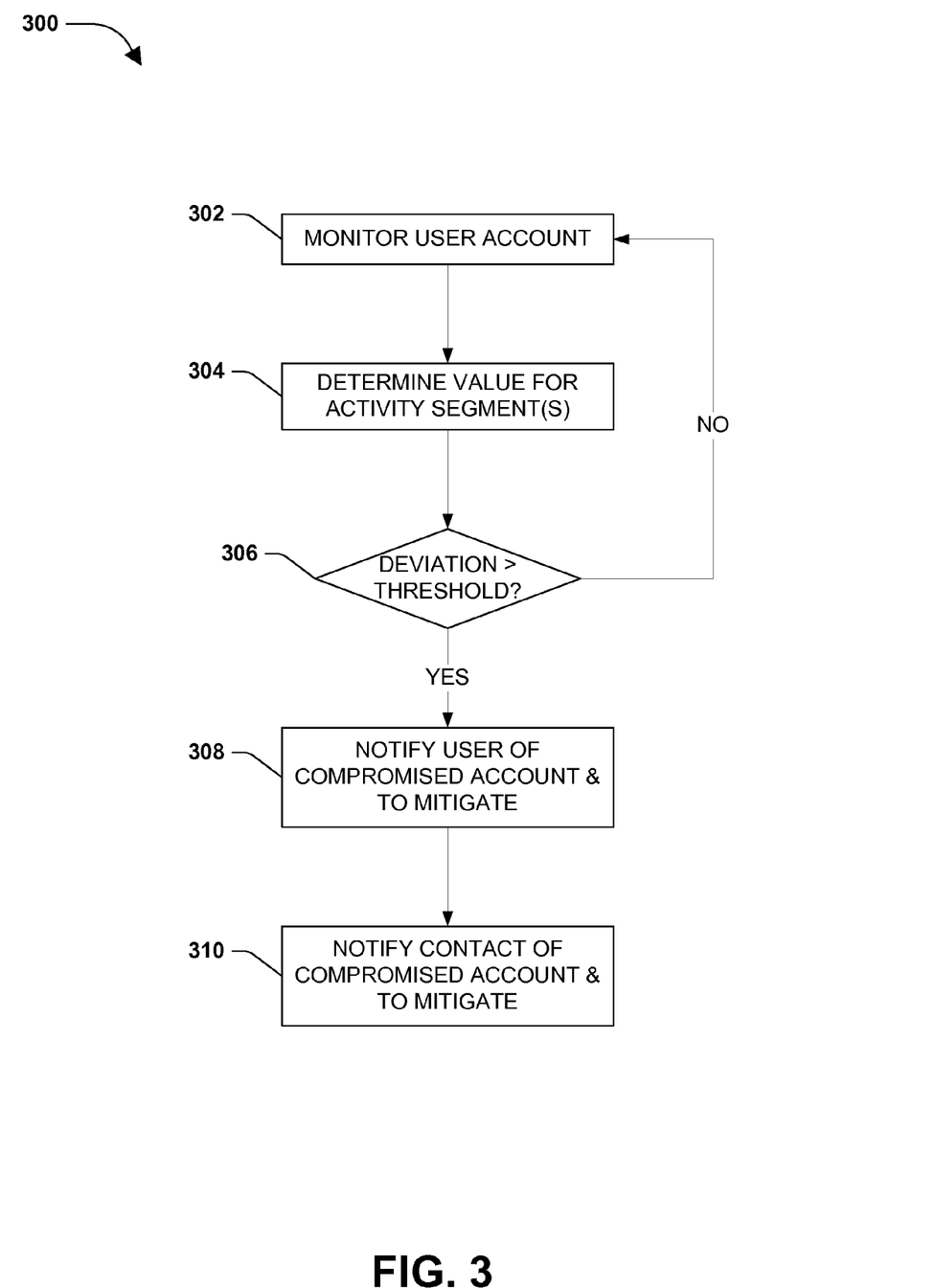
FIG. 3 is a flow diagram illustrating an example embodiment where one or more portions of one or more techniques described herein may be implemented.

In one aspect, the established baseline (e.g., initially established for the account, and/or updated periodically) can be used to compare against monitored ongoing activity for the online user account. FIG. 3 is a flow diagram illustrating an example embodiment 300 where the baseline may be used to detect a deviation in the online user account. At 302, the online user account can be monitored (e.g., periodically or continually) for activity related to one or more activity segments associated with the baseline. For example, at periodic intervals (e.g., daily, weekly, monthly, etc.), which may be set by an administrator or the user of the online account or by a default setting in the account, the use of account related resources associated with one or more activity segments, used to establish the baseline, may be identified.

At 304, an activity segment value can be determined for respective activity segments being monitored. In one embodiment, the activity segment value may be determined in a same manner as was used to determine the baseline value, described above. For example, if a baseline value comprised a percentage of total outgoing IMs that were sent to non-network contacts, the comparative activity segment value may be determined in a same manner. As another example, if a combination of activity segments were used to establish the baseline value, the same combination of activity segments from monitored activity can be used. In this way, for example, when comparing the activity segment value to the baseline value to determine a deviation, the same type of value is used.

In one embodiment, the monitored activity segment data may be applied to (e.g., input into) a trained classifier. In this embodiment, detecting a deviation can comprise inputting one or more activity segment values from a desired period of activity (e.g., periodic or continual) for the online user account into the classifier trained. The classifier can output a probability of a compromised online user account. For example, the periodically identified data may be entered to the classifier to determine a classification for that period, and/or continually collected data may be entered into the classifier to continually identify whether a deviation is present for the account (e.g., likelihood of compromised account at any point in time).

In one embodiment, detecting a deviation for the online user account can comprise comparing activity from one or more activity segments with a desired deviation threshold from the baseline. A desired deviation threshold can comprise a value that is set by the user of the account, for example, or may be determined by a service providing the account monitoring activity. For example, the threshold value may be determined by empirical evidence (e.g., using known compromised accounts to identify deviation values for an activity segment), can be determined by statistical variation (e.g., applying standard deviation calculations from a group of online user accounts to the users account), and/or may be set using a default value (e.g., which may be updated by the user and/or periodically by using periodically collected data).

At 306, if an activity segment value comprises a deviation from the baseline value for that activity segment (e.g., singly or in combination with other activity segment values), the activity segment value can be compared to the deviation threshold value. If the activity segment value does not meet (e.g., or exceed) the threshold value (NO at 306), the online user account can continue to be monitored (e.g., periodically or continually). If the activity segment value meets (e.g., or exceeds) the threshold value (YES at 306), the online user account can be identified at potentially compromised.

At 308, the user of the potentially compromised online user account can be notified, and provided a suggestion to mitigate the problem (e.g., take corrective action to sanitize the account, contact the provider, and/or change security information). In one embodiment, when notifying the user, a notification can be sent using a mode of communication that is identified as having a low probability of being compromised. For example, if a users social network account comprises emails, IMs, and posting modes of communication, the users text-based, voice-based, and/or video-based modes of communication may be less likely to be compromised. Further, text, voice and/or video-based modes of communications may have a higher trust level, as they are typically easier to verify a sender's true credentials.

At 310 in the example embodiment 300, contacts of the online user account can also be notified of the indication of the potentially compromised online user account. For example, a malicious account hijacker may utilize the user's contacts to attempt to hijack more accounts. Often, an account hijacker will send communications to contacts of the hijacked account in an attempt to gather security information for the contact's account (e.g., or to send malicious code), for example. In this example, because the communications come from a supposedly trusted source (the user), the contact may be more likely to provide information to the hijacker (or download malicious code).

In one embodiment, notifying the contacts can comprise sending a notification to respective contacts of the online user account using a mode of communication that is identified as having a high communication trust level. As described above, those communication modes that provide a better ability to verify an identity of the sender may be considered to have a higher trust level, such as voice and/or video communications. Therefore, for example, a voicemail message may be sent out to respective contacts from the user, notifying of the potential compromised nature of the account, and suggesting that the contact consider taking corrective actions (e.g., changing security information for the account).

A system may be devised that helps a user of an online account (e.g., email account, social network, aggregation service, etc.) identify when their account is potentially compromised (e.g., by a malicious hijacker). A user's account related activities, such as communication-related activities, are typically found to stay within a normal use pattern. That is, for example, a number of emails sent and received during any given month for the user account usually remains within a given range. These normal use patterns (e.g., baselines) can be used to detect when the online user account deviates from normal use, for example, to a point indicative of the account being compromised by a hijacker.

Figure 4:
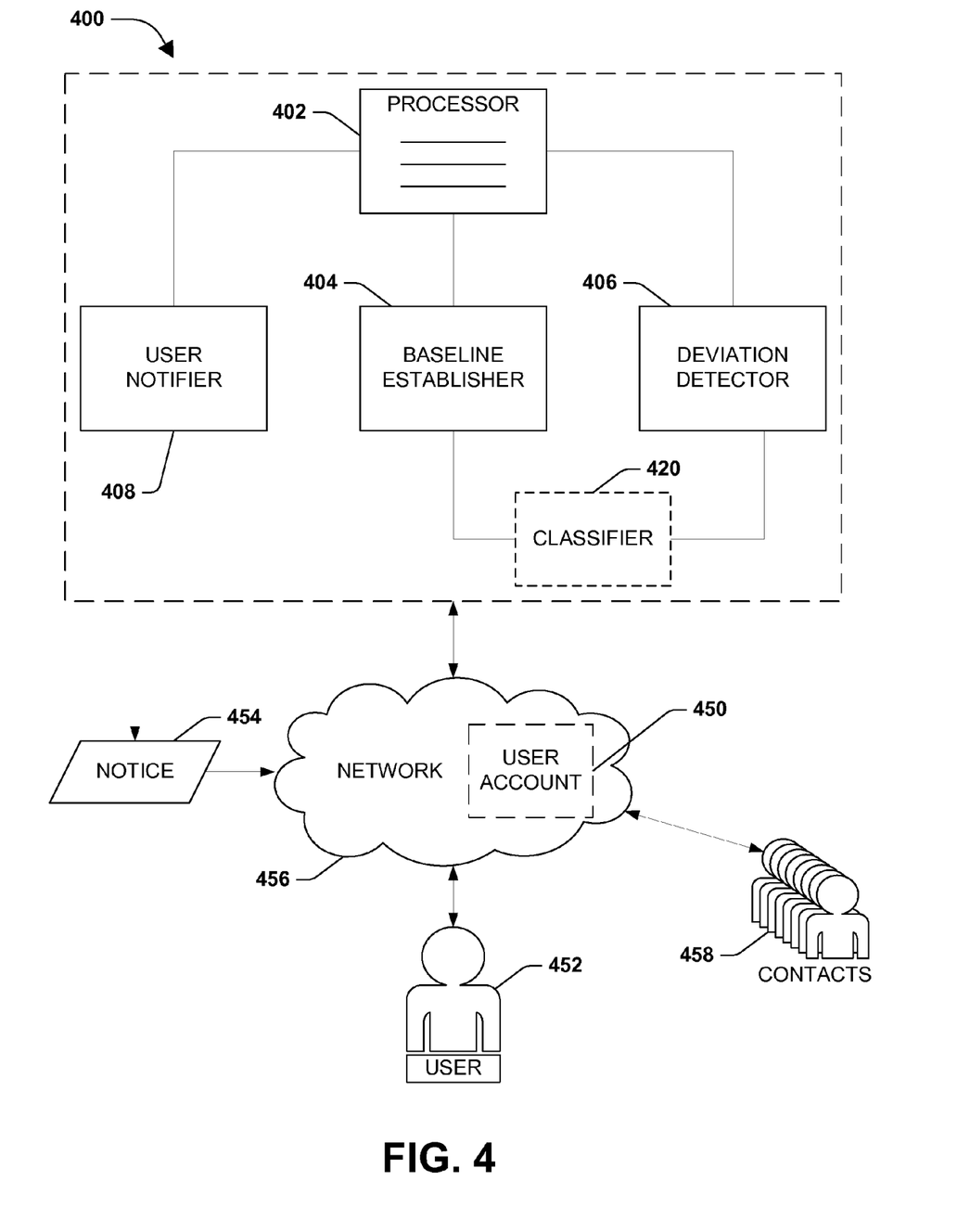
FIG. 4 is a component diagram illustrating an exemplary system for mitigating a compromised online user account.

FIG. 4 is a component diagram illustrating an exemplary system 400 for mitigating a compromised online user account. A computer-based processor 402 is configured to process data for the system and is operably coupled with a baseline establishing component 404. The baseline establishing component 404 is configured to establish a baseline for an online user account 450, which may be accessed using a network 456, such as the Internet.

In one embodiment, the baseline establishing component 404 may identify a baseline value for one or more activity segments associated with the online user account 450. For example, an activity segment can comprise a user 452 (e.g., owner) of the account performing some activity that is linked with the online user account 450, such as posting to a message board for the account, sending a message to one or more contacts 458 linked to the account, uploading content to a status stream for the account, and others.

In one embodiment, the baseline value can comprise a statistical value, for example, which may be identified for respective activity segments, and/or may comprise a statistical value for a combination of activity segments. In this embodiment, the statistical value for an activity segment may represent a frequency of communications between the user and one or more contacts of the online user account. For example, a mean value for a daily number of communications may be used as a frequency statistic (e.g., average number of combined communications per day, both incoming and outgoing). As another example, a frequency statistic can represent a subset of an activity segment, such as a mean value for a daily number of outgoing communications, or merely outgoing emails, for example.

Further, in this embodiment, the statistical value for an activity segment may represent a duration of communications between the user and one or more contacts from the online user account. For example, a median value of communication durations over a desired period (e.g., last week) may be identified. A communication duration may be represented in terms of time (e.g., for voice chats, text chats, IMs, etc.), and/or may be represented in terms of a number of send-response segments (e.g., a number of texts, IMs, comments/responses, or emails sent back and forth during a same conversation/thread), for example. Further, as an example, the statistical value for communication duration may represent a subset of the activity segment, such as a median duration of IMs, or a median duration of outgoing IMs, for example.

Additionally, in this embodiment, the statistical value for an activity segment may represent a mode of communications between the user and one or more contacts from the online user account. For example, a percentage of all modes of communication may be identified for respective modes used for the online user account. As an example, the user may utilize email for twenty-five percent of all communications associated with the account, IMs for ten percent of communications, postings for forty percent, and so-on. As another example, statistics for respective communication modes may be applied to various subsets of the activity segment, such as seventy percent of email communications are outgoing and thirty percent of email communications are incoming, or where email is used for twenty-five percent of all communications (incoming and outgoing), fifteen percent of all outgoing communications comprise email, for example.

In this embodiment, the statistical value for an activity segment may also represent a direction of communications between the user and one or more contacts from the online user account (e.g., outgoing and incoming communications), and/or a type of contact associated with a communication with the user (e.g., in network versus out-of-network contacts). For example, a percentage of total communications may be identified for outgoing messages and incoming messages. Further, for example, a statistical value may be applied to a subset of all the outgoing messages, such as a percentage of outgoing texts. Additionally, for example, a statistical valued for a type of contact may comprise an average number of messages sent to non-network contacts per day. A subset of the type of contact activity segment may comprise an average number of incoming comments to posted messages from in-network contacts, for example.

In the exemplary system 400, a deviation detection component 406 is operably coupled with the processor 402. The deviation detection component 406 is configured to detect a deviation from the baseline that is indicative of a potentially compromised online user account. In one embodiment, the deviation detection component 406 can be configured to compare the baseline with monitored activity for the online user account 450 from a desired period of time in order to determine if a deviation of the monitored activity from the baseline meets a desired potential compromised account threshold.

For example, a threshold value may be identified, such as from empirical data and/or statistically generated data, that represents a deviation indicative of a potentially compromised account. For example, empirical evidence suggests that when an account is compromised by a malicious hacker outgoing emails to non-network (out-of-network) contacts may increase by a certain percentage (e.g., or a mean value of outgoing emails per day increase by a certain percentage). This data may be used by the deviation detection component 406 to establish a threshold value to compare against a monitored value for an activity segment (e.g., outgoing communications), for example.

The exemplary system 400 further comprises a user notification component 408 that is operably coupled with the processor 402. The user notification component 408 is configured to notify the user 452 of the online user account 450 that the indication of the potentially compromised online user account has been detected. In one embodiment, the potentially compromised online user account may comprise a social network account that is being utilized by an unauthorized user, such as over the network 456.

In this embodiment, the user notification component 408 may identify a mode of communication with the user 452 that is less likely to be compromised by the unauthorized user, and can use this identified mode to send a notice 454 to the user 452. Further, in one embodiment, the notice 454 may also prompt the user 452 to disinfect their account 450, and/or update security information for the account (e.g., passwords, security questions, etc.). Additionally, in one embodiment, the user notification component 408 may notify contacts 458 for the online user account 450, such as over the network 456, that the users account may be compromised. In this way, for example, the contacts 458 can take steps to mitigate their accounts being compromised (e.g., by the malicious hijacker of the user account).

In one embodiment, a classification component 420 may be utilized by the exemplary system 400. In this embodiment, the classification component 420 can be configured to determine a baseline value using input from one or more activity segments from historical activity for the online user account. For example, a computer-based classifier can be trained to determine baseline values for activity segments of the online user account, and when updated historical data (e.g., from a recent day, week, month, or desired period) is input to the trained classifier, the output can comprise the (updated) baseline value for the activity segment (e.g., or combination of activity segments).

In one embodiment, the classification component 420 can be configured to determine a monitored value for the online user account 450 using input from one or more activity segments from a desired period of time for activity from the online user account. For example, ongoing monitoring data (e.g., periodically or continually collected) from the online user account, comprising data from one or more activity segments, can be input to the trained classifier. The ongoing monitoring data can comprise data from the same activity segments collected and evaluated for the baseline values, for example. In this embodiment, for example, the output result can comprise a monitoring value that may be compared to the baseline value, such as by the deviation detector 406. In this way, in this embodiment, the deviation detector can determine whether the monitoring data value comprises a deviation that meets a potentially compromised account threshold.

In another embodiment, the classification component 420 can be configured to determine a compromised account probability using input from the baseline and from monitored activity, from a desired period of time, for activity from the online user account. For example, the classification component may be trained over a set of baseline data, and a set of known compromised account data. In this embodiment, for example, monitoring data (e.g., collected from a desired period of time) can be input to the classification component 420 (e.g., comprising the trained classifier), and the output can comprise a probability that the online user account 450 is in a compromised state. In this example, a higher probability value may indicate a higher likelihood that the account is compromised, where a probability threshold may be applied, such as to trigger a notice 454 from the user notification component 408.

Figure 5:
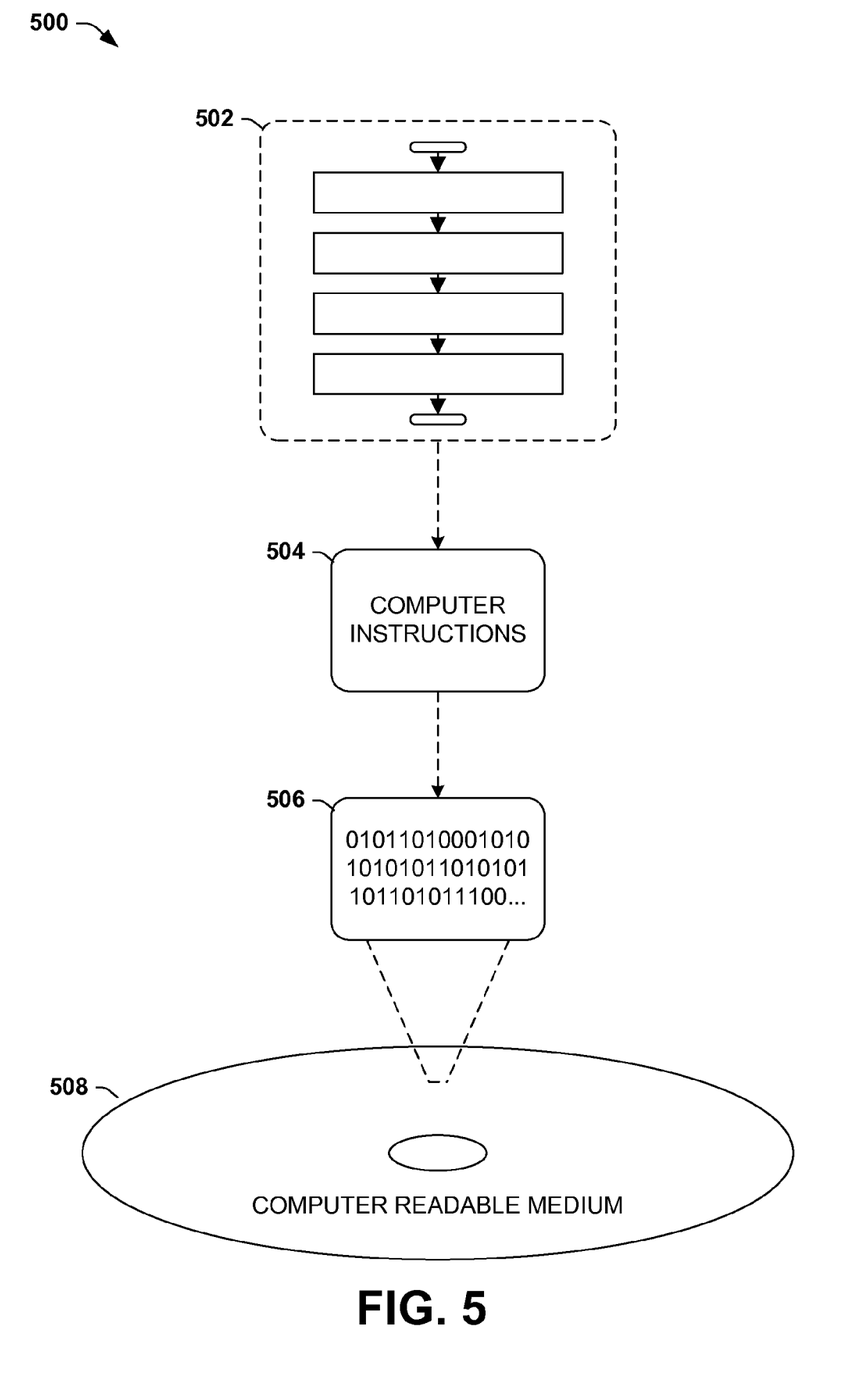
FIG. 5 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as at least some of the exemplary method 100 of FIG. 1, for example. In another such embodiment, the processor-executable instructions 504 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
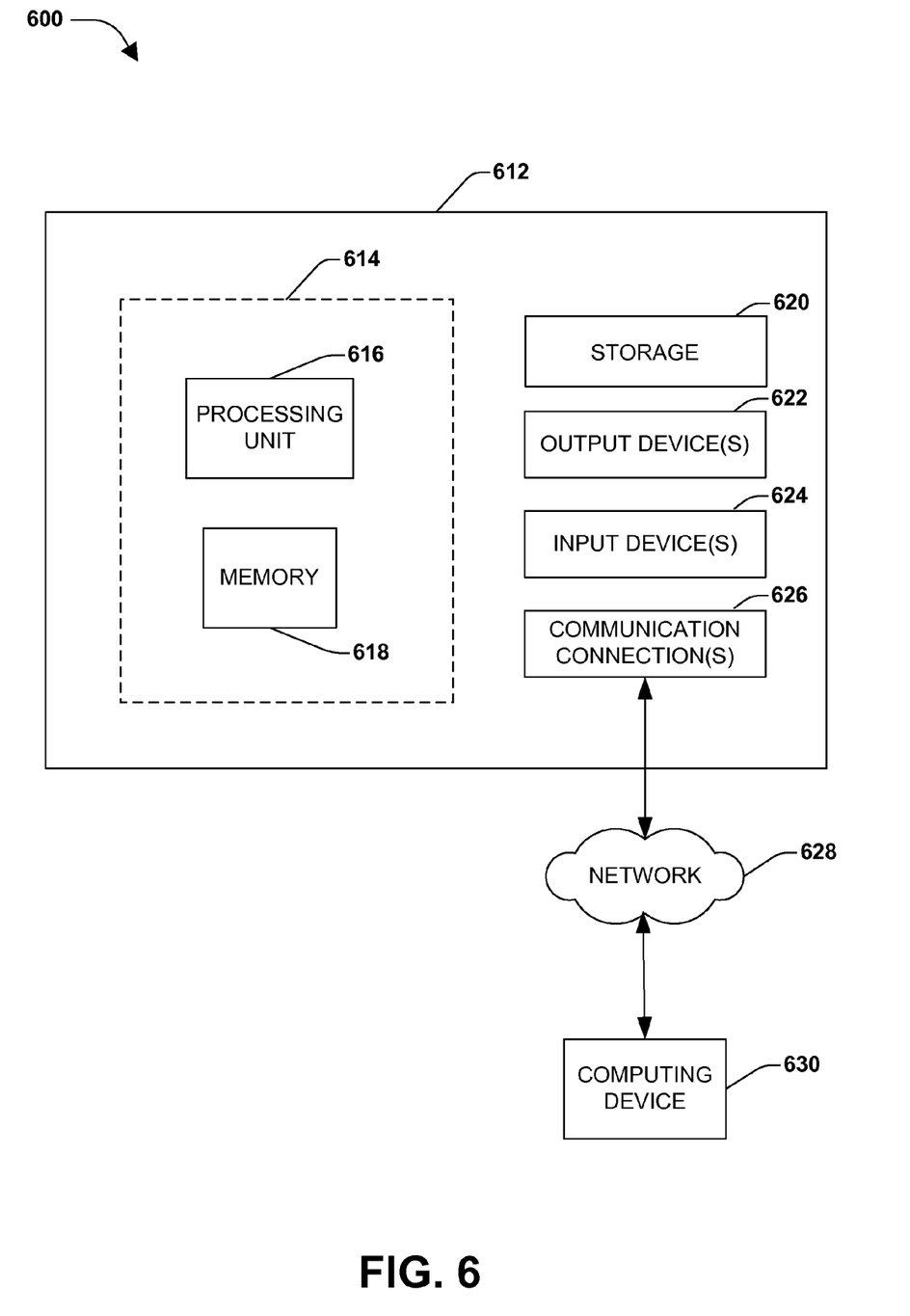
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for mitigating a compromised online user account, comprising:
    establishing a baseline for an online user account comprising identifying information about at least one of communications from the online user account or communications to the online user account, comprising identifying one or more of:
        a duration of one or more communications;
        a mode of one or more communications; or
        a type of a contact associated with one or more communications;
    detecting a deviation from the baseline indicative of a potential compromise to the online user account, detecting a deviation comprising comparing an activity segment value from a desired period of activity for the online user account with a threshold value, the deviation based upon at least one of:
        a duration deviation of one or more durations of one or more first communications from a combination of one or more durations of one or more second communications associated with the baseline, at least one of the one or more durations of the one or more first communications or the one or more durations of the one or more second communications corresponding to a duration of at least one of email messaging, instant messaging (IM), text messaging, voice messaging, video messaging or chatting, posting to a message board, posting a comment to online content, posting an update to a status stream, uploading content, micro-blogging or blogging;
        a mode deviation of one or more modes of one or more third communications from a combination of one or more modes of one or more fourth communications associated with the baseline, at least one of the one or more modes of the one or more third communications or the one or more modes of the one or more fourth communications corresponding to at least one of email messaging, IM, text messaging, voice messaging, video messaging or chatting, posting to a message board, posting a comment to online content, posting an update to a status stream, uploading content, micro-blogging or blogging; or
        a type deviation of one or more types of one or more contacts of one or more fifth communications from a combination of one or more types of one or more contacts of one or more sixth communications associated with the baseline, the one or more types of the one or more contacts of the one or more fifth communications corresponding to at least one of an age of the one or more contacts of the one or more fifth communications, how long the one or more contacts of the one or more fifth communications have been linked to the online user account, whether the one or more contacts of the one or more fifth communications are linked to the online user account or whether the one or more contacts of the one or more fifth communications are comprised in an address book of the online user account; and
    notifying a user of the online user account of the potential compromise.

2. The method of claim 1, comprising notifying contacts of the online user account of the potential compromise.

3. The method of claim 2, notifying contacts comprising sending a notification to respective contacts utilizing a mode of communication that is identified as having a desired communication trust level.

4. The method of claim 1, comprising notifying the user to take corrective action.

5. The method of claim 1, comprising notifying contacts of the online user account to take corrective action.

6. The method of claim 1, detecting a deviation comprising monitoring the online user account for activity related to one or more activity segments associated with the baseline.

7. The method of claim 1, establishing a baseline comprising establishing a baseline value for one or more activity segments of the online user account.

8. The method of claim 1, establishing a baseline comprising determining a historical use of the online user account by the user for a desired period of time.

9. The method of claim 1, establishing a baseline comprising identifying activity in one or more activity segments for the online user account, the one or more activity segments comprising communication-related activity between the user and one or more contacts.

10. The method of claim 1, identifying information comprising identifying a frequency of one or more communications.

11. The method of claim 1, detecting a deviation comprising comparing activity from one or more activity segments of the online user account with a desired deviation threshold from the baseline.

12. The method of claim 1, comprising notifying the user to update security information.

13. The method of claim 1, detecting a deviation comprising inputting one or more activity segment values from the desired period of activity for the online user account into a classifier trained using the baseline to output a probability of a compromised online user account.

14. The method of claim 1, notifying a user comprising sending a notification to the user utilizing a mode of communication that is identified as having a desired probability of being non-compromised.

15. A system, implemented at least in part via a processing unit, for mitigating a compromised online user account, comprising:
   a baseline establishing component configured to establish a baseline for an online user account by identifying information about at least one of communications from the online user account or communications to the online user account, comprising identifying a duration of one or more communications;
   a deviation detection component configured to detect a deviation from the baseline indicative of a potential compromise to the online user account, detecting a deviation comprising comparing an activity segment value from a desired period of activity for the online user account with a threshold value, the deviation based upon a mode deviation of one or more modes of one or more first communications from a combination of one or more modes of one or more second communications associated with the baseline, at least one of the one or more modes of the one or more first communications or the one or more modes of the one or more second communications corresponding to at least one of email messaging, instant messaging (IM), text messaging, voice messaging, video messaging or chatting, posting to a message board, posting a comment to online content, posting an update to a status stream, uploading content, micro-blogging or blogging; and
   a user notification component configured to notify a user of the online user account of the potential compromise.

16. The system of claim 15, the online user account comprising a micro-blogging account.

17. The system of claim 15, the user notification component configured to notify the user to update security information.

18. The system of claim 15, the baseline comprising a statistical value representing a frequency of communications between the user and one or more contacts.

19. The system of claim 15, the online user account comprising a social network account.

20. A computer readable medium, excluding signals, comprising instructions that when executed perform a method for mitigating a compromised online user account, comprising:
   establishing a baseline for an online user account comprising identifying information about at least one of communications from the online user account or communications to the online user account, comprising identifying a type of a contact associated with one or more communications;
   detecting a deviation from the baseline indicative of a potential compromise to the online user account, detecting a deviation comprising comparing an activity segment value from a desired period of activity for the online user account with a threshold value, the deviation based upon a type deviation of one or more types of one or more contacts of one or more first communications from a combination of one or more types of one or more contacts of one or more second communications associated with the baseline, the one or more types of the one or more contacts of the one or more first communications corresponding to at least one of an age of the one or more contacts of the one or more first communications, how long the one or more contacts of the one or more first communications have been linked to the online user account, whether the one or more contacts of the one or more first communications are linked to the online user account or whether the one or more contacts of the one or more first communications are comprised in an address book of the online user account; and
   notifying a user of the online user account of the potential compromise.

* * * * *